United States Patent [19]

Leake et al.

[11] Patent Number: 5,055,503

[45] Date of Patent: Oct. 8, 1991

[54] WATER RESISTANT ALKALINE CORRUGATING ADHESIVE COMPOSITION AND PAPERBOARD PRODUCT PRODUCED THEREWITH

[75] Inventors: Craig H. Leake, Edison; John J. Tsai, Belle Mead; Eric A. Meier, Hamilton Sq., all of N.J.

[73] Assignee: National Starch and Chemical Investment Holding Corporation, Wilmington, Del.

[21] Appl. No.: 371,889

[22] Filed: Jun. 26, 1989

[51] Int. Cl.$^5$ .......................... C08J 3/10; C08L 3/04; C08L 51/02

[52] U.S. Cl. ........................ 524/30; 524/47; 527/312; 527/313; 527/314; 156/328; 156/326; 156/327

[58] Field of Search .................. 524/30, 47; 527/312–314; 156/326–327, 328

[56] References Cited

U.S. PATENT DOCUMENTS

| | | | |
|---|---|---|---|
| 3,728,141 | 4/1973 | Ray-Chawdhuri et al. | 524/47 |
| 3,944,428 | 3/1976 | Schoenberg et al. | 106/213 |
| 4,009,311 | 2/1977 | Schoenberg | 428/182 |
| 4,400,480 | 8/1983 | Silano et al. | 524/47 |
| 4,424,291 | 1/1984 | Leake et al. | 524/47 |
| 4,690,996 | 9/1987 | Shih et al. | 523/130 |
| 4,775,706 | 10/1988 | Iovine et al. | 524/47 |

FOREIGN PATENT DOCUMENTS 9145266  2/1983  Japan .................................... 524/47

OTHER PUBLICATIONS

J. B. Wright et al., "Histamine Antagonists, VII Phenothiazine Derivatives", Journal of Amer. Chem. Soc., vol. 72, pp. 3536–3539, Aug. 1950.

Primary Examiner—John Kight, III
Assistant Examiner—P. Hampton-Hightower
Attorney, Agent, or Firm—Eugene Zagarella, Jr.; Edwin M. Szala

[57] ABSTRACT

A water resistant, starch-based alkaline corrugating adhesive which includes a polysaccharide graft copolymer containing a reactive aminoethyl halide group.

21 Claims, No Drawings

WATER RESISTANT ALKALINE CORRUGATING ADHESIVE COMPOSITION AND PAPERBOARD PRODUCT PRODUCED THEREWITH

BACKGROUND OF THE INVENTION

This invention relates to a starch-based, alkaline corrugating adhesive composition and the corrugated paperboard product produced therewith. The adhesive of the present invention may be used to provide formaldehyde-free corrugated paper products which are water resistant and have good adhesion properties.

The term "corrugated paperboard" as used herein refers to a fluted medium and a facing adhesively joined to the tips on one or both sides of the fluted medium.

The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together an adhesive board is formed there between. The above-described procedure produces what is known to those skilled in the art as a single faced board in that the facing is applied to only one surface thereof. If a double-faced paperboard in which an inner fluted layer sandwiched between two facings is desired, a second operation is preformed wherein the adhesive is applied to the exposed tips of the single-faced board and the adhesive-coated tips are then pressed against a second facing in the combining section of the corrugator under the influence of pressure and heat. The typical corrugating process and the operation and use of corrugators in general are described in U.S. Pat. Nos. 2,051,025 and 2,102,937 issued on Aug. 18, 1936 and Dec. 21, 1937 respectively to Bauer.

The particular adhesive employed in the corrugating process is selected on the basis of several factors, including the type of bond required in the final application of the finished corrugated product. Starch-based adhesives are most commonly used due to their desirable adhesive properties low cost and ease of preparation.

The most fundamental of starch corrugating adhesives is an alkaline adhesive which is comprised of raw ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the full formation adhesive in the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and formation of the adhesive bond.

It is often desired or necessary in the manufacture of corrugated paperboard that the adhesive yield water-resistant bonds which can withstand extended exposure to high humidity, water, melting ice and the like. A number of approaches have been devised to produce water-resistant corrugating adhesives. One method involves the preparation of an acidic, starch-based adhesive wherein urea-formaldehyde resin is added to the composition, together with an acidic catalyst such as aluminum sulfate, to produce water-resistant bonds in the corrugated board manufactured therewith. The adhesive composition itself, however, is deficient in other important properties such as corrugator bonding speeds, viscosity stability, and pot life and exhibits excessive formaldehyde odor. In addition acidic corrugating adhesives tend to be corrosive.

The many disadvantages associated with the acidic corrugating adhesives led to the development of water-resistant alkaline curing starch-based adhesives for use in the corrugating industry. In the preparation thereof, a thermosetting resin, such as. e.g., urea-formaldehyde, resorcinol-formaldehyde, melamine-formaldehyde, phenol-formaldehyde, diacetone acrylamide-formaldehyde, ketone-aldehyde and urea-acetone-formaldehyde condensate, has been added to the adhesive as a cross linking additive for the amylaceous components to produce water-resistant bonds.

In recent years, due to the uncertainty of the safety of formaldehyde, efforts have been made to reduce the levels of exposure to formaldehyde in the industrial workplace. U.S. Pat. No. 4,400 480 issued on Aug. 23, 1983 to M. Silano et al. employs an acetone-formaldehyde condensate cross-linking additive low in free formaldehyde in an alkaline curing corrugating adhesive.

Despite the advances made to reduce the level of formaldehyde exposure, the corrugating industry is still searching for means for providing water resistance to corrugated paperboard products using formaldehyde-free alkaline curing starch based adhesives.

Accordingly, it is an object of the present invention to provide a water-resistant, formaldehyde-free alkaline starch-based adhesive composition which is useful in the manufacture of corrugated paperboard.

SUMMARY OF THE INVENTION

The present invention provides a water-resistant formaldehyde-free, starch-based alkaline corrugating adhesive composition wherein a polysaccharide graft copolymer containing a reactive aminoethyl halide group replaces all or a part of the gelatinized starch in the carrier portion of the adhesive composition.

More particularly, the alkaline curing starch-based corrugating adhesive composition of this invention comprises:

(A) from about 10 to 50% by weight, based on the total weight of the adhesive, of starch, this including the ungelatinized as well as the gelatinized portion of the starch;

(B) from about 0 5 to 20% by weight of a graft copolymer solids basis, based on the total weight of adhesive, the graft copolymer containing a reactive aminoethyl halide group and comprising the graft of a polysaccharide substrate and a diallylaminoethyl halide monomer of the formula:

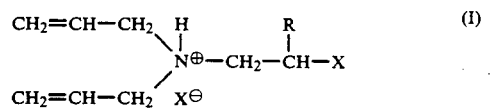

where X is a halogen and R is hydrogen or an alkyl group of 1 to 2 carbons;

(C) from about 40 to 90% by weight based on the total weight of the adhesive, of water; and (D) sufficient alkali to provide the adhesive with a pH of greater than 7.

This invention further relates to a corrugated paperboard product which is prepared by adhesively bonding a facing to a fluted paper strip wherein the tips of the corrugations of the fluted paper strip are coated with the above described adhesive composition.

DETAILED DESCRIPTION OF THE INVENTION

The starch component of the adhesive composition of this invention may be wholly ungelatinized or consist of both gelatinized and ungelatinized starch portions and may be selected from any of several starches, native or converted, heretofore employed in starch corrugating adhesive compositions. Suitable starches include, for example, those starches derived from corn, potato, waxy maize, sorghum, wheat, as well as high-amylose starches, i.e., starches which contain 50% or more by weight of amylose, and the various derivatives of these starches, Hence, among the applicable starches are included the various starch derivatives such as ethers, esters thin-boiling types prepared by known processes, e.g., mild acid treatments oxidation, etc. Preferred starches are those typically employed in corrugating adhesives of the alkaline type.

The starch content of the adhesive can vary considerably depending on several factors such as the intended end-use application of the adhesive and the type of starch used. The total amount of starch employed, including gelatinized and ungelatinized portions of starch, ordinarily will be in the range of about 10%–50% by weight, based on the total weight of the adhesive. In compositions where gelatinized starch is employed in addition to ungelatinized starch, the total starch content of the adhesive will typically range from about 25 to 50% In compositions where no gelatinized starch is employed, ungelatinized starch will be present in amounts ranging from about 10 to 40%. When describing the starch content of the adhesive throughout this application, including both the specification and claims, it is not intended to include any starch present in the polysaccharide graft copolymer component, i.e., the polysaccharide substrate.

The polysaccharide graft copolymer component is used in this invention as a cross-linking additive and/or a replacement for all or a part of the gelatinized starch in the carrier portion of the alkaline starch-based corrugating adhesive composition. This graft copolymer contains a reactive aminoethyl halide group and comprises the graft of a polysaccharide substrate and a diallylaminoethyl halide monomer of the formula (I).

The polysaccharide substrates used in preparing the graft copolymers include starches, starch conversion products derived from any source and starch derivatives; cellulose and cellulose derivatives; and various plant gums, Starches, including those derived from corn, potato, wheat, rice, sago, tapioca, waxy maize, sorghum and amylose, as well as the conversion products and derivatives thereof, are the preferred substrates due to their cost and availability. For certain end uses, derivatized starches, such as ethers and esters, have been found effective. In particular, starches derivatized with allyl glycidyl ether have shown advantageous properties in making graft copolymers for use in corrugating adhesive compositions in accordance with this invention.

The monomer used in preparing the graft copolymers has a polymerizable diallyamino structure and a reactive aminoethyl halide moiety and is represented by the following formula:

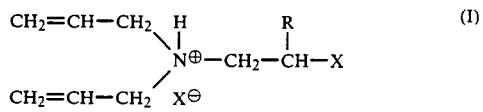

where X is a halogen which may be chlorine bromine or iodine preferably chlorine or bromine and more preferably chlorine and R is H or alkyl of 1 to 2 carbons, preferably H or methyl and more preferably hydrogen. Additionally, the monomer may contain one or more other substituents, such as alkyl groups and a longer chain R group, on either the allyl groups or the ethyl halide moiety, as long as the monomer remains polymerizable and suitable for graft polymerization. The monomer (I) may be prepared in a sequential reaction wherein (1) diallylamine is reacted with a suitable 1,2 epoxide such as ethylene oxide, propylene oxide or butylene oxide, followed by (2) reaction with thionyl halide. This method of preparation is disclosed by J. B. Wright et al. in an article entitled "Histamine Antagonists. VII. Phenothiazine Derivatives" *J. Amer. Chem. Soc.*, 72 pp. 3556–3559, 1950. An alternate preparation technique involves reaction of aminoethanol with allyl chloride followed by replacement of the hydroxy group with halogen using reagents well known in the art, including thionyl halides and tri and penta-valent phosphorus halides.

While the polysaccharide graft copolymers may be prepared using only the diallylaminoethyl halide monomers (I), other ethylenically unsaturated comonomers that are polymerizable and suitable for graft polymerization may be included, if desired. Suitable comonomers will depend on the desired application as well as the particular process by which the graft copolymer is prepared. Typical comonomers that may be used include: acrylic and methacrylic acid, acrylamide, methacrylamide, acrylonitrile vinyl pyrrolidone styrene sulfonate salts, alkyl or hydroxyalkyl acrylates and methacrylates. Acrylamide is a preferred comonomer.

The method of preparing the polysaccharide graft copolymers involves the free radical polymerization of the diallylaminoethyl halide monomer (I) with a polyaaccharide base substrate while maintaining the system at a pH level on the acid side or below 7. to prevent premature reaction of the halogen on the aminoethyl halide group during the polymerization reaction. As indicated earlier, various methods for preparing graft copolymers of polysaccharides are known in the art, including free radical initiation with chemicals, high energy radiation or heat, in solution suspension, emulsion or other mediums. While any of these methods can generally be used in carrying out the graft polymerization of this invention, the additional and essential step of maintaining the system under neutral or slightly acidic conditions is required to retain the reactive halide group, e.g., chloride, for later reaction as desired. Therefore to prevent premature reaction of the halide, the pH of the system should be maintained below 7. More particularly, the pH of the system is maintained at from about 1 to about 6 and preferably from about 2 to 5. When it is desired to initiate or trigger the reactivity of the halide group, the pH can be adjusted to the alkaline side.

Typically, the graft polymerization may involve an inverse emulsion wherein the polysaccharide, monomer, and optionally comonomer are emulsified in an oil phase containing an emulsifying agent and polymerized therein by heating under free radical conditions. This method is disclosed in U.S. Pat. 4,690,996 issued Sept. 1, 1987, and such disclosure is incorporated herein by reference. Another method used to carry out the graft polymerization involves solution polymerization wherein an aqueous solution containing the saccharide, monomer and optionally comonomer, are heated in the presence of a free radical initiator.

Free radical yielding initiators useful herein in the polymerization of ethylenically unsaturated monomers, include but are not limited to initiators such as benzoyl peroxide, lauryl peroxide, potassium persulfate; and redox couples such as tertiary butyl hydroperoxide and sodium metabiusulfite, and the like. The actual initiator or catalyst concentration necessary to generate sufficient free radicals, so as to affect polymerization depends upon the particular reaction conditions such as temperature, time, starting materials and the amounts thereof and the free radical initiating temperature of the initiator. Accordingly, the initiator level can vary widely, advantageously ranging in amounts between about 0.002 to 3% by weight of the monomeric components of the graft.

Reaction temperatures of typically between about 40° and 75° C. are used with free radical yielding initiators. Within such a temperature range, conversion is substantially complete in from one-half hour to several days, depending upon monomer and reaction variables. The reaction is generally carried out at atmospheric pressure or substantially atmospheric pressure. However, superatmospheric pressure is advantageously used when volatile ingredients are involved.

The polysaccharide may be used in any form, so long as that form renders the polymer molecules available for graft copolymerization. For example, in one embodiment an acid converted starch derivative is gelatinized by cooking in water to yield an aqueous starch dispersion. In such a dispersion, the starch molecules are more readily accessible for graft copolymerization than are the starch molecules of an aqueous starch granule slurry.

The amount of polysaccharide substrate may vary from about 1 to 99%, preferably from about 5 to 95% and more preferably from about 30 to 70% by weight of the final graft copolymer. The amount of monomer may vary from about 1 to 99%, preferably from about 2 to 50% and more preferably from about 5 to 20% by weight of the final graft copolymer. The amount of comonomer used will also vary from 0 to 95%, preferably from about 0 to 50% by weight of the final graft copolymer.

It will be recognized by these skilled in the art that various solvents, surfactants, buffers and other additives conventionally used, may generally be incorporated into the methods for preparing the graft polymers as defined herein. It is further noted, that final graft copolymer structure will not be a simple graft copolymer arrangement, but will include some cross-linking, copolymerizing and cyclopolymerizing of the diallyl moieties and other components in the system. This is expected and the degree of each will vary depending on the conditions components and amounts used.

The amount of graft copolymer employed ordinarily will be in the range of about 0 5 to 20% by weight solids basis and preferably from about 1 to 15% based on the total weight of the adhesive.

The alkali (base) employed herein is preferably sodium hydroxide; however, other bases may be used in partial or full replacement of the sodium hydroxide and include, for example, alkali metal hydroxides such as potassium hydroxide, alkaline earth hydroxides such as calcium hydroxide, alkaline earth oxides such as barium oxides, alkali metal carbonates such as sodium carbonate, and alkali metal silicates such as sodium silicate. The alkali is usually employed in aqueous form in amounts sufficient to provide the adhesive with a pH greater than 7 more particularly from of about 7 5 to 13 and preferably from about 10 to 13. Typically, this represents an amount of from about 0 3 to 5% and preferably about 1 to 4% by weight based on the weight of starch.

Another common ingredient of corrugating adhesives is a boron-containing salt, e.g., borax which is useful as a tackifier and which is optionally used in amounts of up to about 5% by weight. based on the total weight of starch. Additionally, any conventional non-chemically functional additives may be incorporated into the adhesive in minor amounts, if desired. Such additives include, for example, preservatives; defoamers; wetting agents; plasticizers solubilizing agents; rheology modifiers; water conditioners; penetration control agents; peptizers such as urea; gelatinization temperature modifiers; inert fillers such as clay and finely ground polymers; thickeners such as inorganic colloidal clays, guar, hydroxethyl cellulose, alginates, polyvinyl alcohol, polymers of ethylene oxide and the like; colorants; and emulsions such as polyvinyl acetate.

In preparation of the adhesive compositions of this invention, there are several different ways in which the ingredients can be added depending, for example, on the adhesive solids desired, the equipment available, and whether or not gelatinized starch is present in the composition. In adhesives where gelatinized starch is employed, the starch is typically gelatinized in water with caustic soda and then slowly added to a slurry of raw starch and water. The graft copolymer may be added to the raw starch mixture or to the final adhesive mixture as desired. In adhesives without a gelatinized starch component, application onto the fluted tips may be improved by the addition of thickeners such as these described above. Such adhesives are typically prepared by dissolving the thickener in water and thereafter adding the raw starch, graft copolymer, and alkali or mixtures thereof to the thickened dispersion. The order of addition of the adhesive components is not critical to the water resistance exhibited. Optional ingredients, if desired, can be added at any convenient point during the preparation of either the raw starch mixture or the carrier component.

The adhesives herein can be used to bond single- or double-faced boards using any equipment which is presently employed for the preparation of corrugated board. Thus, the adhesive is usually maintained at a temperature of between 21° and 43° C. before its application to the protruding tips of the fluted paper strip. The actual application may be accomplished by the use of glue rolls which are ordinarily employed in most corrugating machines, or one may, if desired, utilize other application methods which may be able to achieve a different distribution of adhesive. Following the application of the adhesive to the fluted paper strip, the latter is then brought into immediate contact with the facing board under the influence of heat and pressure, as is well known in the art. A double-faced board may be subsequently prepared by bringing a second facing in contact with the open fluted surface of the single-faced board by the usual procedures.

Any of the various paperboard substrates may be utilized in combination with the adhesive composition of the present invention in order to provide corrugated paperboard. As the corrugating adhesive of the present invention provides water resistant properties, it is usually desirable to utilize a water resistant paperboard in combination with the adhesive in order to provide a water resistant corrugated paperboard product. One preferred paperboard product is a wax impregnated paperboard, however, any of the various water resistant paperboard products such as, e.g., resin impregnated paperboard, may be utilized in combination with the water resistant adhesive of the present invention.

In the following examples which are merely illustrative of the various embodiments of this invention, all parts and percentages are given by weight and all temperatures are in degrees Celsius unless otherwise noted. The term "water fluidity" (WF) as used herein, is a measure of the degree of degradation of the starch and is measured using a Thomas Rotational Shear-Type Viscometer (manufactured by Arthur H. Thomas Co., Philadelphia, Pa.) in accordance with standard procedures such as are disclosed in U.S. Pat. No. 4,499,116 issued Feb. 12, 1985 to Zwiercan et al.

EXAMPLE I

This example describes the preparation of the graft copolymer of diallylaminoethyl chloride and starch.

Diallylamine was reacted with ethylene oxide to give diallylaminoethanol and this was reacted with thionyl chloride to give an aqueous solution of diallylaminoethyl chloride in accordance with the method disclosed by J. B. Wright et al., *J. Amer. Chem. Soc.*, 72, pp. 3556–3559, 1950.

An allyl glycidyl ether derivatized starch was prepared as follows. A total of 100 parts of acid hydrolyzed waxy starch (water fluidity, WF-85) was slurried in an aqueous solution of 1.5 parts of sodium hydroxide and 25 parts of sodium sulfate in 150 parts water, then 0.2 parts of allyl glycidyl ether was added to the starch slurry. The mixture was agitated at 40° C. for 16 hours and the pH was lowered to 5.5 by adding 9.3% aqueous hydrochloric acid. The starch derivative was recovered by filtration, washed three times with water and air dried. This starch was designated starch "A".

Graft copolymers were prepared using the following solution graft polymerization technique.

A starch dispersion was prepared by cooking 50 parts of the allyl glycidyl ether derivatized starch, i.e., starch A in 180 parts of degased water for 20 minutes. The starch dispersion was added to a 250 ml four-neck round bottom flask equipped with a mechanical stirrer, condenser, addition funnel and nitrogen inlet. A total of 6.6 parts of diallylaminoethyl chloride (hereinafter DAAEC) prepared as noted above and 50 parts of acrylamide were added and the temperature raised to 65°–70° C. under nitrogen gas. An initiator solution of potassium persulfate (total of 0.1 g diluted to 2.0 g in degased water) was added in three portions one hour apart. The reaction mixture was held for an additional three hours. The resulting mixture was acetone precipitated and washed to remove unreacted DAAEC monomer with the resulting graft copolymer identified as sample A. Another graft polymer, sample B, identical to sample A was prepared in the same manner except that 60 parts of the allyl glycidyl ether derivatized starch and 40 parts of acrylamide were used.

Two additional graft copolymers samples C and D were prepared in the same manner as samples A and B. Sample C used 50 parts of a low molecular weight dextrin starch, 6.6 parts of DAAEC prepared as noted above and 50 parts of acrylamide. Sample D used 60 parts of low molecular weight dextrin starch, 6.6 parts of DAAEC and 40 parts of acrylamide.

EXAMPLE II

This example illustrates the preparation of a typical corrugating adhesive which employs gelatinized starch in the carrier portion of the adhesive.

Preparation of Carrier Starch

To 379 l. (100 gal ) of water is added 90.5 kg (200 lb ) of corn starch and the resultant slurry is heated to 55° C. with agitation. About 19.1 (5 gal.) of water containing 15 kg (32 lb.) sodium hydroxide is then added to the slurry and mixing is continued for about 15 minutes. At the end of this period, about 379 l. (100 gal ) of water is added to cool and dilute the resultant dispersion.

Preparation of Full-Formation Adhesive

The carrier starch dispersion above prepared is added to a slurry of 454 kg (1000 lb.) corn starch, 11 kg (24 lb.) borax ($Na_2B_4O_7 5H_2O$) and about 1136 l. (300 gal.) of water.

EXAMPLE III

This example illustrates the water-resistant properties of bonds formed with the corrugating adhesives representative of this invention. The adhesives were employed in the preparation of a double-faced bond of corrugated paperboard via the following method which simulates conditions on the double-back section of a corrugator.

Each adhesive was applied at 6 mil thickness by a Bird applicator to a glass plate and was transferred to sheets of single-face web of 62 lb./1000 ft$^2$ (0.302 kg/m$^2$) wet strength liner and 30 lb./1000 ft$^2$ (0.146 kg./m$^2$) wet strength medium by means of direct hand pressure. The single-face samples were then placed on top of the wet strength liner and the resultant double-faced board was bonded at 0.25 psi on a hot plate at 177° C. for 4 seconds. The bonded beards were then placed in a conditioning atmosphere of 22° C., 50% relative humidity for 24 hours. Dry 2×4 inch samples and other 2×4 inch samples of the boards placed in water at 22° C. for up to 24 hours were tested as described below.

The sample boards were evaluated for dry pin adhesion and wet pin adhesion using the tests described in TAPPI Standard UM 802 (formerly R 337) employing a conventional testing apparatus obtainable from Testing Machines Inc Mineola, N.Y. The test results were recorded in terms of lb. (per 24 inches of glue line) required to separate completely the double-face liner from the single-face web.

Using the graft copolymers A and B and the adhesive formulations described above, samples were prepared to evaluate the use of the copolymers as cross-linking additives wherein 1.2% by weight of the copolymers was added based on total adhesives weight. The wet pin adhesion test previously described was used and results for the adhesives using graft copolymers A and B as an additive were 3 lb. and 6 lb. wet pin adhesion, respectively. This compared with a control alkaline corn adhesive which gave 0 wet pin adhesion.

The graft copolymers C and D wore also evaluated as additives in adhesive formulations at two different levels, 1.2% and 2.4% polymer solids on total adhesive weight. The dry and wet pin adhesion test results, obtained as described above, are as follows:

|  | Adhesive (C) | | Adhesive (D) | | Control Corn Adhesive |
| --- | --- | --- | --- | --- | --- |
|  | 1.2% | 2.4% | 1.2% | 2.4% |  |
| Dry Pin Adhesion (lb.) | 151.0 | 172.0 | 139.0 | 163.0 | 143 |
| 1 hr. Wet Pin Adhesion (lb.) | 4.8 | 6.0 | 5.2 | 7.5 | 0 |
| 4 hr. Wet Pin Adhesion (lb.) | 5.2 | 6.5 | 4.9 | 6.9 | 0 |
| 24 hr. Wet Pin Adhesion (lb.) | 5.3 | 6.5 | 6.0 | 5.2 | 0 |

EXAMPLE IV

Adhesive compositions using graft copolymers A, B, C and D, prepared as described above and having the following formulations, were evaluated, as carriers (i.e., containing no gelatinized starch carrier):

Samples A and B as Carrier

| Ingredient | Amount |
| --- | --- |
| water | 115 g |
| 10 mole borax | 2.1 g |
| raw corn starch | 94 g |
| polymer A or B | 94 g |
| 25% sodium hydroxide (to raise pH to 11.5–12.0) | 8.4 g |

The wet pin adhesion test, previously described, was used and results when using graft copolymers A and B as the carrier portion gave wet pin adhesion of 16 and 14 lb, respectively. This compared with a control alkaline corn adhesion which gave 0 wet pin adhesion.

Samples C and D as Carrier

| Ingredient | Amount |
| --- | --- |
| water | 85 g |
| raw corn starch | 75 g |
| polymer C or D | 78 g |
| 25% sodium hydroxide (to raise pH to 11.5–12.0) | 8 g |

The graft copolymers C and D were also evaluated as carries using the adhesive formulation described above and gave the following dry and wet pin adhesion test results:

| | Adhesive (C) | Adhesive (D) | Control Corn Adhesive |
| --- | --- | --- | --- |
| Dry Pin Adhesion (lb.) | 161.0 | 152.0 | 143 |
| 1 hr. Wet Pin Adhesion (lb.) | 20.7 | 18.4 | 0 |
| 4 hr. Wet Pin Adhesion (lb.) | 20.5 | 21.4 | 0 |
| 24 hr. Wet Pin Adhesion | 22.3 | 20.6 | 0 |

What is claimed is:

1. A water-resistant alkaline curing corrugating adhesive composition comprising:
   (A) from about 10 to 50% by weight, based on the total weight of the adhesive, of starch, this comprising ungelatinized starch or a mixture of ungelatinized and gelatinized starch;
   (B) from about 0.5 to 20% by weight of a graft copolymer, solids basis, based on the total weight of adhesive, the graft copolymer containing a reactive aminoethyl halide group and comprising the graft of a polysaccharide substrate and a diallylaminoethyl halide monomer of the formula:

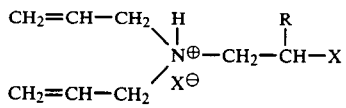

where X is a halogen and R is hydrogen or an alkyl group of 1 to 2 carbons;
   (C) from about 40 to 90% by weight, based on the total weight of the adhesive, of water; and
   (D) sufficient alkali to provide the adhesive with a pH of greater than 7.

2. The corrugating adhesive of claim 1 further comprising a tackifying amount of borax.

3. The corrugating adhesive of claim 2 wherein the polysaccharide substrate is starch, X is chlorine and R is hydrogen or methyl.

4. The corrugating adhesive of claim 3 wherein from about 1 to 15% by weight of the graft copolymer is used.

5. The corrugating adhesive of claim 2 wherein the graft copolymer includes an ethylenically unsaturated comonomer.

6. The corrugating adhesive of claim 5 wherein the polysaccharide is starch, X is chlorine, R is hydrogen or methyl and from about 1 to 15% by weight of the graft copolymer is used.

7. The corrugating adhesive of claim 6 wherein the comonomer is acrylamide.

8. The corrugating adhesive of claim 1 wherein the starch component consists of ungelatinized and gelatinized starch selected from the group consisting of corn, high amylose corn, and tapioca starch and mixtures in an amount of from about 25 to 50% by weight based on the total weight of adhesive.

9. The corrugating adhesive of claim 8 wherein the polysaccharide substrate is starch, X is chlorine, R is hydrogen or methyl and from about 1 to 15% by weight of the graft copolymer is used.

10. The corrugating adhesive of claim 9 further comprising a tackifying amount of borax and the graft copolymer includes an ethylenically unsaturated comonomer.

11. The corrugating adhesive of claim 1 wherein the starch component consists of ungelatinized starch in an amount of from about 10 to 40% by weight based on the total weight of adhesive.

12. The corrugating adhesive of claim 11 wherein the polysaccharide substrate is starch, X is chlorine R is hydrogen or methyl and from about 1 to 15% by weight of the graft copolymer is used.

13. The corrugating adhesive of claim 12 further comprising a tackifying amount of borax and the graft copolymer further includes an ethylenically unsaturated comonomer.

14. A corrugated paperboard product prepared employing the adhesive composition of claim 1.

15. A corrugated paperboard product prepared employing the adhesive composition of claim 10.

16. A corrugated paperboard product prepared employing the adhesive composition of claim 13.

17. A process for preparing corrugated paperboard comprising the steps of:
(1) applying to the tips of the corrugations of a fluted paper strip a water-resistant, alkaline curing corrugating adhesive composition comprising:
  (A) from about 10 to about 50% by weight, based on the total weight of the adhesive of starch, this including ungelatinized starch or a mixture of ungelatinized and gelatinized starch;
  (B) from about 0.5 to 20% by weight of a graft copolymer, solids basis, based on the total weight of adhesives, the graft copolymer containing a reactive aminoethyl halide group and comprising the graft of a polysaccharide substrate and a diallylaminoethyl halide monomer of the formula:

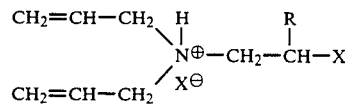

where X is a halogen and R is hydrogen or an alkyl group of 1 to 2 carbons;
  (C) about 40 to 90% by weight, based on the total weight of adhesive, of water; and
  (D) sufficient alkali to provide the adhesives with a pH of greater than 7.

18. The process of claim 17 wherein the polysaccharide substrate is starch, X is chlorine, R is hydrogen or methyl and from about 1 to 15% by weight of the graft copolymer is used.

19. The process of claim 18 wherein the corrugating adhesive further comprises a tackifying amount of borax and the graft copolymer further includes an ethylenically unsaturated comonomer.

20. The process of claim 19 wherein the comonomer is acrylamide and the corrugating adhesive has a pH of from about 7 5 to 13.

21. The process of claim 19 wherein the starch component consists of ungelatinized starch in an amount of from about 10 to 40% by weight based on the total weight of the adhesive.

* * * * *